United States Patent
Kani et al.

(10) Patent No.: US 8,495,939 B2
(45) Date of Patent: Jul. 30, 2013

(54) TABLE SAWS WITH SLIDABLY MOVABLE FENCES

(75) Inventors: Toshiyuki Kani, Anjo (JP); Masahiko Miura, Anjo (JP); Shinya Kojima, Anjo (JP); Kenji Abe, Anjo (JP)

(73) Assignee: Makita Corporation, Anjo (JP)

( * ) Notice: Subject to any disclaimer, the term of this patent is extended or adjusted under 35 U.S.C. 154(b) by 471 days.

(21) Appl. No.: 12/382,609

(22) Filed: Mar. 19, 2009

(65) Prior Publication Data
US 2009/0235797 A1    Sep. 24, 2009

(30) Foreign Application Priority Data

Mar. 21, 2008  (JP) ................................ 2008-073914
Dec. 2, 2008   (JP) ................................ 2008-307292

(51) Int. Cl.
B23D 33/02 (2006.01)
B26D 7/01 (2006.01)
B26D 1/18 (2006.01)

(52) U.S. Cl.
USPC ............................... 83/490; 83/473; 83/468.2

(58) Field of Classification Search
USPC .................... 83/71.1–471.3, 473, 477.2, 397, 83/483–490, 581, 468.1–468.4
See application file for complete search history.

(56) References Cited

U.S. PATENT DOCUMENTS

| 3,302,669 A * | 2/1967 | Edler ............................ 83/471.3 |
| 4,745,834 A * | 5/1988 | Neumann ........................ 83/468 |
| 4,751,865 A * | 6/1988 | Buckalew ........................ 83/745 |
| 4,798,113 A * | 1/1989 | Viazanko ...................... 83/471.3 |
| 5,016,693 A * | 5/1991 | Haffely et al. .............. 144/253.2 |
| 5,038,486 A * | 8/1991 | Ducate, Sr. ...................... 33/430 |
| 5,297,463 A * | 3/1994 | O'Banion et al. ............ 83/468.3 |
| 5,325,900 A * | 7/1994 | Garuglieri ................... 144/135.2 |
| 5,752,422 A   | 5/1998 | Inoue et al. |
| 5,755,148 A   | 5/1998 | Stumpf et al. |
| 5,855,366 A * | 1/1999 | Chang ............................ 269/315 |
| 6,334,380 B1* | 1/2002 | Huang .......................... 83/471.2 |

(Continued)

FOREIGN PATENT DOCUMENTS

EP    0 586 171 A2    3/1994
EP    2 156 930 A2    2/2010

(Continued)

OTHER PUBLICATIONS

Oct. 24, 2011 European Search Report issued in European Patent Application No. 09004047.8.

(Continued)

*Primary Examiner* — Ghassem Alie
*Assistant Examiner* — Bharat C Patel
(74) *Attorney, Agent, or Firm* — Oliff & Berridge, PLC

(57) ABSTRACT

A table saw includes a table capable of supporting a workpiece, a cutting unit and a positioning fence. The positioning fence has a positioning surface for supporting the workpiece. The positioning surface is divided into an upper positioning surface and a lower positioning surface that are positioned above the table. First slide fences allocated to the lower positioning surface and second slide fences allocated to the upper positioning surface are slidably supported in a table surface direction relatively independent from each other. The positioning surfaces of the first and second slide fences constitute an entire region of the positioning surface. In this way, the entire region of the positioning surface is made to be slidable in accordance with various operation modes.

12 Claims, 10 Drawing Sheets

U.S. PATENT DOCUMENTS

| | | | |
|---|---|---|---|
| 6,425,309 B1 * | 7/2002 | Stumpf et al. | 83/468.2 |
| 6,513,412 B2 * | 2/2003 | Young | 83/471.3 |
| 6,543,323 B2 * | 4/2003 | Hayashizaki et al. | 83/466 |
| 6,899,005 B1 | 5/2005 | O'Banion et al. | |
| 7,156,008 B2 * | 1/2007 | Talesky | 83/468.2 |
| 2002/0100350 A1 * | 8/2002 | Brazell | 83/438 |
| 2003/0150311 A1 * | 8/2003 | Carroll et al. | 83/471.3 |
| 2004/0079214 A1 * | 4/2004 | Meredith et al. | 83/471.3 |
| 2005/0028662 A1 * | 2/2005 | Judge | 83/581 |
| 2005/0247178 A1 | 11/2005 | Hetcher et al. | |
| 2006/0011037 A1 * | 1/2006 | Ushiwata et al. | 83/581 |
| 2007/0006704 A1 * | 1/2007 | Chiu | 83/581 |
| 2008/0053283 A1 * | 3/2008 | Lin et al. | 83/440 |

FOREIGN PATENT DOCUMENTS

| | | |
|---|---|---|
| JP | A-63-102824 | 5/1988 |
| JP | U-6-5820 | 1/1994 |
| JP | B2-3286725 | 3/2002 |
| JP | A-2003-001601 | 1/2003 |
| JP | A-2003-211402 | 7/2003 |
| JP | A-2006-044068 | 2/2006 |
| JP | A-2006-167885 | 6/2006 |
| JP | A-2006-306100 | 11/2006 |
| WO | WO 2005/102626 A2 | 11/2005 |

OTHER PUBLICATIONS

Jun. 29, 2011 Partial European Search Report issued in European Patent Application No. 09004047.8.

Mar. 5, 2013 Office Action issued in Japanese Patent Application No. 2008-307292 (with translation).

* cited by examiner

TABLE SAWS WITH SLIDABLY MOVABLE FENCES

This application claims priority to Japanese patent application serial numbers 2008-73914 and 2008-307292, the contents of which are incorporated herein by reference.

BACKGROUND OF THE INVENTION

1. Field of the Invention

The present invention relates to table saws for cutting a workpiece by means of a cutting unit having, for example, a circular grinder or a rotary blade such as a saw blade. In particular, present invention relates to table saws that have a positioning fence for positioning and fixing a workpiece on a table and cut or perform other working operations on a workpiece by moving the cutting unit in a downward direction.

2. Description of the Related Art

Table saws have included a table for placing and fixing a workpiece thereon, and a cutting unit supported operably movable relative to the table in a vertical direction. The cutting unit has an electric motor as a power source and a circular rotary blade driven by the electric motor. When an operator moves the cutting unit vertically downward with the rotating rotary blade while the workpiece is fixed on the table, the rotary blade can cut into the workpiece to perform the cutting operation. A positioning fence is provided on the table for positioning a workpiece on a table surface direction (relative to a table surface). In the case of a cutting device having a turntable rotatably supported on a base, both end portions of the positioning fence are fixed to the base and the positioning fence extends over the turntable. Therefore, if the turntable type cutting device is used, the rotary blade can be moved from a perpendicular position to a tilted position relative to a positioning surface of the positioning fence when the table is rotated by a predetermined angle and the cutting unit is integrally rotated in a left or right direction. By this means, so-called oblique cutting operation can be performed. Further, besides the angle cutting operation, so-called inclined cutting operation can be performed, if the cutting unit is tilted in a direction, in which a rotational axis of the rotary blade is inclined relative to the upper surface of the table.

A positioning surface of the positioning fence contacts with a workpiece and a rotational axis of the table is positioned within a plane of the positioning surface.

This type of positioning fence is disclosed in U.S. Pat. No. 6,899,005, U.S. Pat. No. 5,755,148, Japanese Laid-Open Utility Model Publication No. 6-5820 and Japanese Patent No. 3286725. For example, movable positioning fences disclosed in U.S. Pat. No. 6,899,005 can slide in left and right directions relative to a rotary blade and have positioning surfaces that are positioned on the left and right sides of the rotary blade, respectively. According to this movable positioning fences, the above-mentioned oblique cutting operation or inclined cutting operation can be performed without interfering with the rotary blade by sliding one of movable fences in a direction away from the rotary blade. Conversely, if any one of the movable fences is slidably moved toward the rotary blade to form a high positioning surface, a relatively tall workpiece can be positioned standing diagonally between the upper surface of the table and the movable fence in an increased-height position.

The positioning surface of each of the positioning fences extends vertically upward above the table surface and is divided into an upper and a lower positioning surface. The upper positioning surface is defined by an upper movable fence member, which is slidably movable in left and right directions, however, the lower positioning surface is defined by a lower fence member fixed without being allowed to move. Therefore, the lower positioning surface must be fixed having a predetermined clearance to the rotary blade in order to perform the oblique cutting operation or inclined cutting operation.

Because the lower fence member must be fixed to have a sufficient clearance relative to the rotary blade, a narrow part of the workpiece is not allowed to contact with the positioning surface due to the clearance, for example, when the workpiece is vertically cut from the end with a small width (slicing operation). Therefore, it may be difficult to perform an exact cutting operation because a positioning accuracy for a narrow part of the workpiece is not ensured.

Thus there is a need in the art to provide a table saw that can securely avoid an interference with the rotary blade when an inclined cutting operation or an oblique cutting operation is performed. Further, there is a need to achieve a highly accurate positioning function even if the cutting operation is performed with a small width.

SUMMARY

One aspect according to the present invention includes a table saw with a positioning fence. The positioning fence has a positioning surface for a workpiece that is formed with a first slide fence and a second slide fence that are vertically aligned with each other. The positioning surface can be slidably moved by moving the first slide fence and/or the second slide fence. In this way, the first lower slide fence can also be moved between a position close to the rotary blade and a position away from the rotary blade. Therefore, a clearance defined between the rotary blade and the fence can be determined to be minimum without being interfered by the rotary blade when the inclined cutting operation or the angle cutting operation is normally performed. Consequently, even when the cutting operation is performed with small width, the cutting operation can be performed with a workpiece securely fixed in a position while a workpiece is abutted to the first or second fences. Therefore, a positioning function of the positioning fence can be reliably exercised.

In one aspect, the table saw can perform various cutting operations with a workpiece positioned at the positioning surface without being interfered by the rotary blade. In an entire range extending vertically upward from a table surface, one of the left or right slide fences is slidaby moved in a direction away from the rotary blade while the other one of the left or right slide fences is moved toward the rotary blade within a range that the slide fences do not interfere with the rotary blade, when an angler cutting operation is performed by turning the table or when a inclined cutting operation is performed by tilting a cutting unit to the left or right.

In another aspect, only the second slide fence can slide relative to the first slide fence or both first and second slide fences can slide together relative to the table, while the first slide fence is fixed to the table. In this way, the positioning fence can be used in various forms in accordance with the various cutting operations.

In another aspect, the table saw includes a slide support portion of the first slide fence relative to a frame and a slide support portion of the second slide fence relative to the first slide fence. Even though a rattling (a clearance) is generated in a direction perpendicular to the sliding direction due to an inaccuracy by processing or mounting these slide support portions, rattling can be controlled by adjusting a penetration depth of a screw provided for a clearance restricting member.

Therefore, it is possible to achieve an accurate and quick positioning.

In another aspect, either a wide positioning surface or a narrow positioning surface can selectively and slidably moved.

In another aspect, the operability and the versatility of the table saw can be improved, because the positioning fence can be used in a mode in accordance with various factors, for example, a size and/or a configuration of a workpiece. In addition, even a large workpiece can be securely positioned, because a positioning surface to be pressed against a workpiece can be maintained to be large while the cutting unit is avoided to interfere with the rotary blade.

In another aspect, more detailed mode selection is possible in accordance with various factors, for example, a size and/or a configuration of a workpiece while the cutting unit is avoided to interfere with the rotary blade. Accordingly, the operability and the versatility of the positioning fence can be improved.

DETAILED DESCRIPTION OF THE INVENTION

Each of the additional features and teachings disclosed above and below may be utilized separately or in conjunction with other features and teachings to provide improved table saws. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
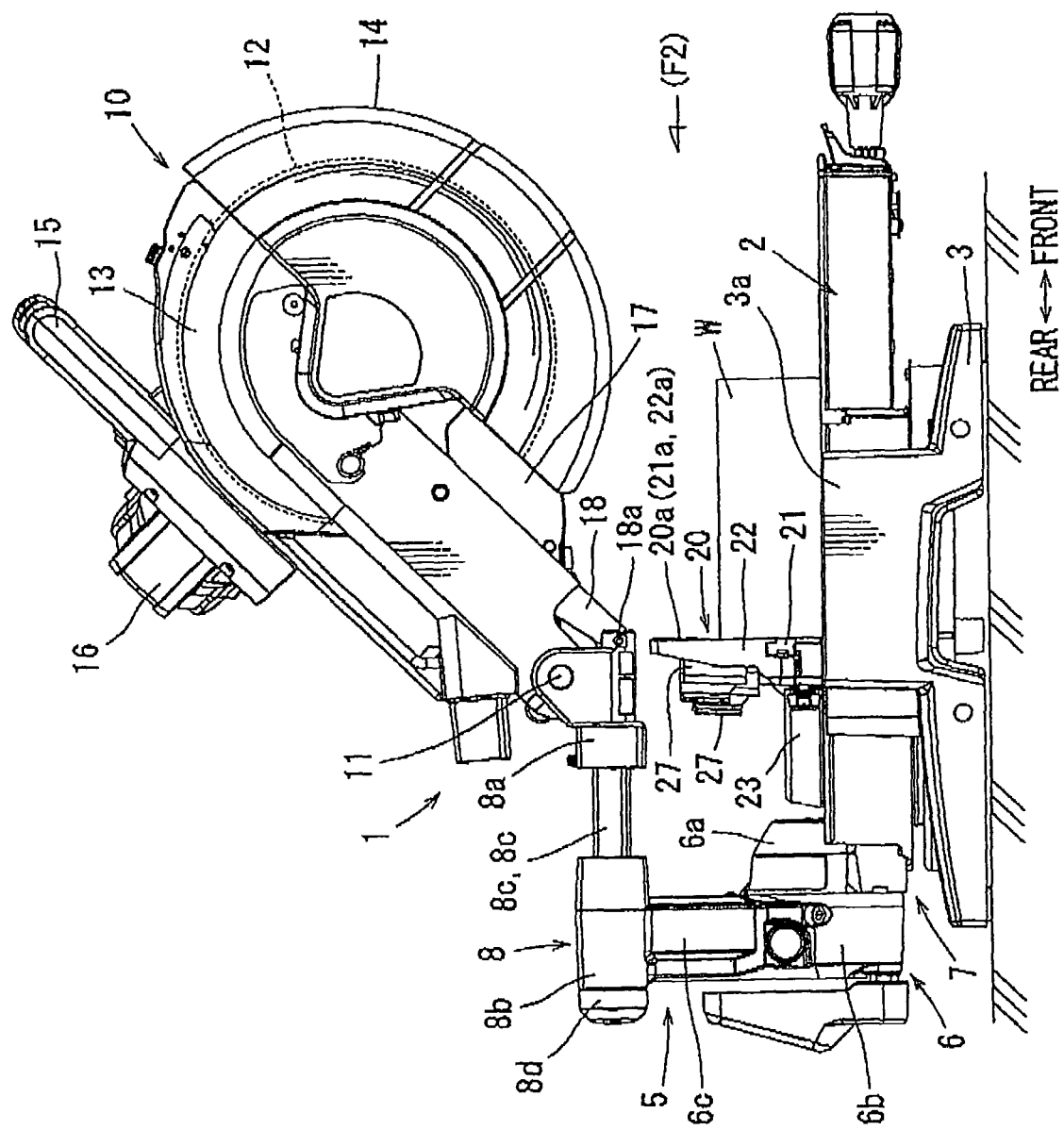
FIG. 1 is an entire side view of a table saw according to one aspect.
Figure 2:
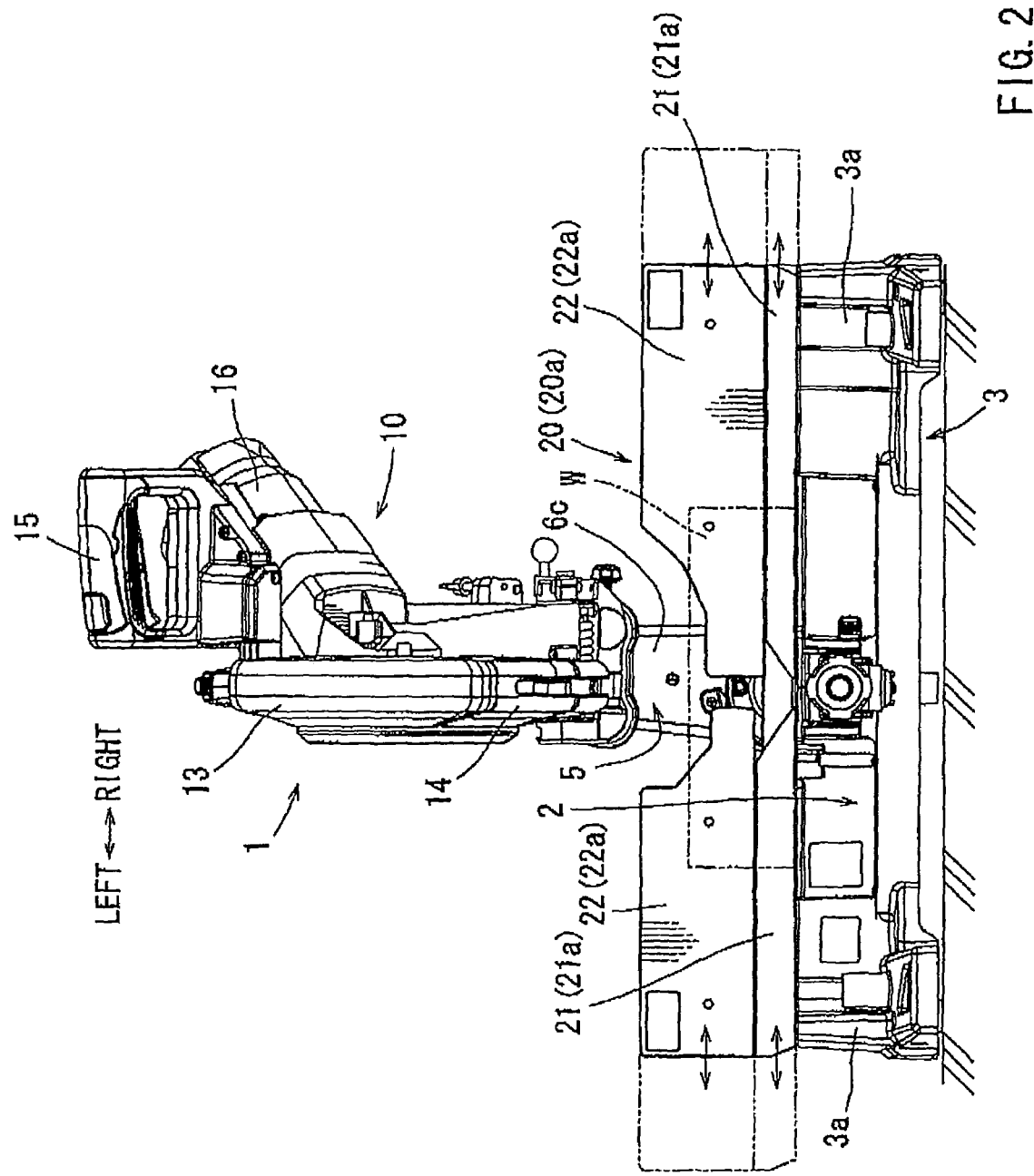
FIG. 2 is a front side view from an arrow direction (F2) shown in FIG. 1.

A first aspect of a table sawmill now be described with reference to FIGS. 1 to 8. FIGS. 1 and 2 show a cutting device 1. In FIG. 1, an operator may be positioned on the right side of the cutting device 1. Hereinafter, the right side of FIG. 1 (a front side as viewed from an operator) is considered to be a front side and the left side to be a rear side of each member and construction. FIG. 2 shows a front side of the cutting device 1 as viewed from the operator.

The cutting device 1 includes a substantially round table 2 for placing a workpiece W, a base 3 for rotatably supporting the table 2 within a horizontal plane, a cutting unit 10 disposed above the table 2 via a cutting unit support portion 5 provided at a rear portion of the table 2 (a left portion in FIG. 1) and a positioning fence 20 for positioning a workpiece W along an upper surface of the table 2 (in a table surface direction).

The cutting unit 10 is supported on the front end side of the cutting unit supporting portion 5 such that the cutting unit 10 can be vertically pivoted around a vertically pivotally supporting shaft 11. The cutting unit support portion 5 includes a lateral tilt mechanism 6 for laterally tiltably supporting the cutting unit 10 and, a lower slide mechanism 7 and an upper slide mechanism 8 for enabling the cutting unit 10 to slidably move back and forth in a direction along the table surface. The lower slide mechanism 7 includes a pair of right and left slide bars and bearings (not shown) for slidably supporting the pair of slide bars at a position below the table 2.

The lateral tilt mechanism 6 includes a fixed-side support member 6a provided on the side of the table 2 and a tiltable-side support member 6b provided on the side of the cutting unit 10. Both support members 6a and 6b are pivotally connected with each other via a laterally pivotally supporting shaft (not shown) that is supported to extend along a table surface in a front and back direction. The support member 6a provided on the fixed side is supported to a rear portion of the table 2 via the lower slide mechanism 7. A cutting unit support arm 6c upwardly extends from an upper portion of the support member 6b. The upper slide mechanism 8 is connected to an upper portion of the cutting unit support arm 6c. The upper slide mechanism 8 includes a bearing holder 8b mounted to an upper end portion of the cutting unit support arm 6c and a pair of slide bars 8c slidably supported in a horizontal direction via a bearing disposed within the bearing holder 8b. Front end portions of both slide bars 8c are connected with each other via a cutting unit support bracket 8a and rear end portions are also connected with each other via a connecting bracket 8d. The cutting unit 10 is vertically pivotally supported on the cutting unit support bracket 8a via the vertically pivotally supporting shaft 11.

When cutting unit 10 is slidably moved by a stroke within a plane parallel to the table surface by means of the lower slide mechanism 7 and the upper slide mechanism 8, a workpiece W can be cut. When the cutting unit 10 is tilted by means of the lateral tilt mechanism 6 by a predetermined angle to the left or right as viewed from an operator assuming that the operator is positioned in front of the cutting unit 10, an inclined cutting operation can be performed.

The cutting unit 10 includes a circular rotary blade 12 that can be rotated by an electric motor 16 disposed on the rear side (the right side as viewed from the operator) of the cutting unit 10. An upper portion of the rotary blade 12 is always covered by a fixed cover 13. A lower portion of the rotary blade 12 is covered by a movable cover 14 that is opened or closed in response to the vertical movement of the cutting unit 10. The movable cover 14 is opened or closed in response to the displacement movement of a link lever 18 that is vertically pivotally supported to the cutting unit support bracket 8a via a support shaft 18a When the cutting unit 10 is moved upward and positioned in a rest position as shown in FIG. 1, a part of the cutting edge of the rotary blade 12 that is not covered by either of the covers 13 and 14, may be covered by an auxiliary cover 17. The auxiliary cover 17 also opens and closes in response to the vertical movement of the cutting unit 10.

A rear portion of the fixed cover 13 is supported to the cutting unit support bracket 8a of the upper slide mechanism 8 via the vertically pivotaily supporting shaft 11. A handle 15 adapted to be grasped by an operator is disposed at an upper portion of the electric motor 16. The handle 15 is a horizontal-type handle with a grip portion laterally extending as viewed from the operator.

Cutting directions of the rotary blade 12 relative to the workpiece W can be changed to the left or right by turning the table 2 to the left or right. This configuration can perform an oblique cutting operation. During the oblique cutting operation, a rotational axis of the rotary blade 12 is maintained parallel to an upper surface of the table 2 (within a plane parallel to the surface of the table 2). Further, another cutting operation that can be performed is an inclined cutting operation, when the rotary blade 12 cuts into the workpiece W at an angle while the cutting unit 10 is tilted to the left or right by means of the lateral tilt mechanism 6. During the inclined cutting operation, the rotational axis of the rotary blade 12 is maintained (not to be parallel) but inclined relative to the upper surface of the table 2.

A positioning fence 20 is supported by the base 3. Both sides of the base 3 extend laterally outward from the left and right sides of the table 2 to form base portions 3a. The upper surfaces of the base portions 3a are arranged to be flush with the upper surface of the table 2. Clamp devices for fixing a workpiece W on the upper surface of the table 2 are mounted to the left and right base portions 3a. The clamp devices are not shown in the drawings.

The positioning fence 20 is supported at the left and right base portions 3a and extends over the table 2. As shown in FIG. 1, a right side surface (front surface) of the positioning fence 20 serves as a positioning surface 20a that contacts with a workpiece W. FIG. 2 shows an entire region of the positioning surface 20a. The entire region of the positioning surface 20a is divided vertically into an upper positioning surface and a lower positioning surface. The lower positioning surface is defined by front surfaces (first positioning surfaces 21a) of a pair of first slide fences 21 arranged on the left and right sides. The upper positioning surface is defined by front surfaces (second positioning surfaces 22a) of a pair if second slide fences 22 arranged on the left and right sides.

Figure 3:
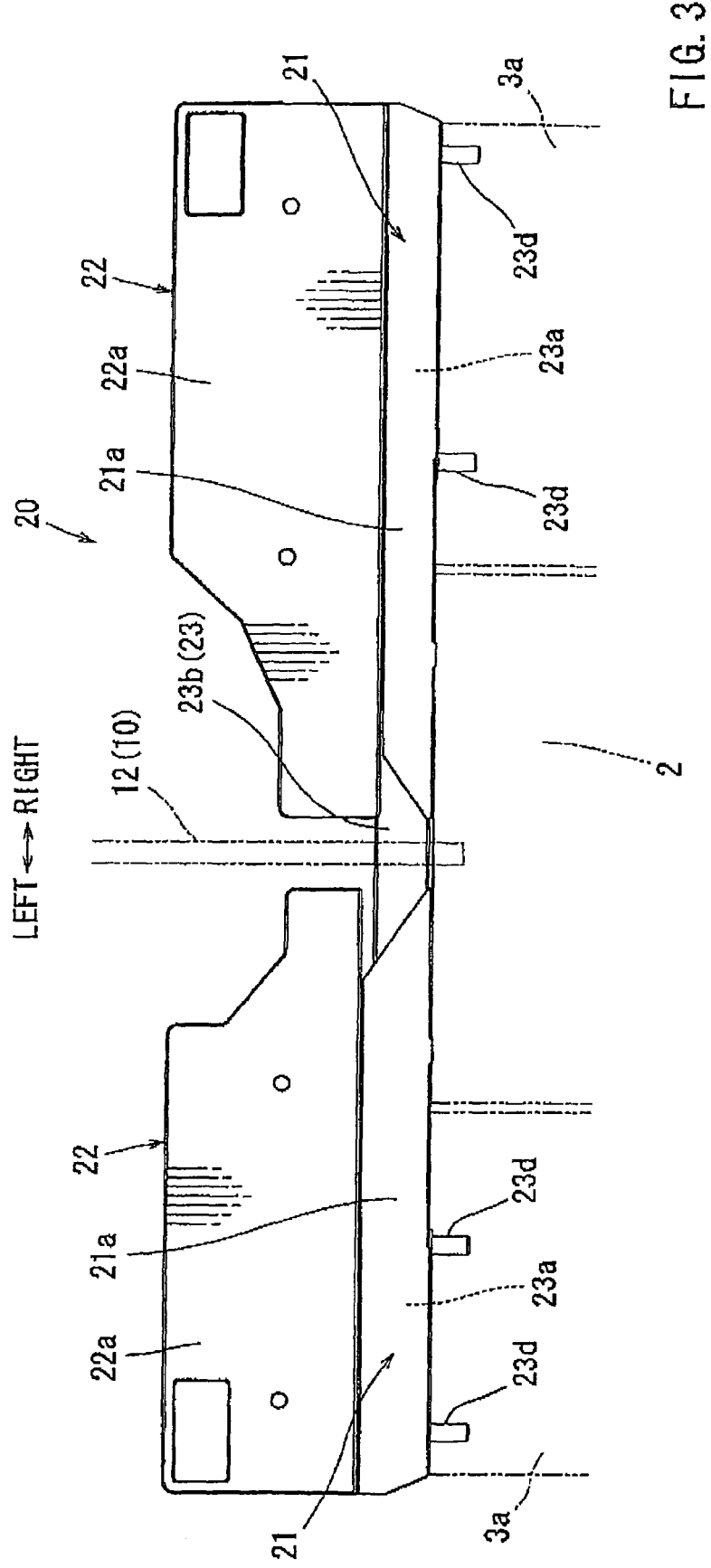
FIG. 3 is a front view of a positioning fence.

As shown in FIGS. 1 and 2, a vertical length of the first positioning surfaces 21a of the first slide fences 21 is substantially the same as of a frame 23. As shown in FIG. 3, the vertical length of the first positioning surface 21a on the left side is slightly longer than the first positioning surface 21a on the right side. On the other hand, a vertical length of the positioning surfaces 22a of the second slide fences 22 is determined to be longer in relation to the first positioning surfaces 21a so that the positioning surfaces 22a can be used for vertically leaning or positioning a longitudinal workpiece or a plate against the positioning surfaces 22a (positioning for tall workpiece or plate).

Figure 4:
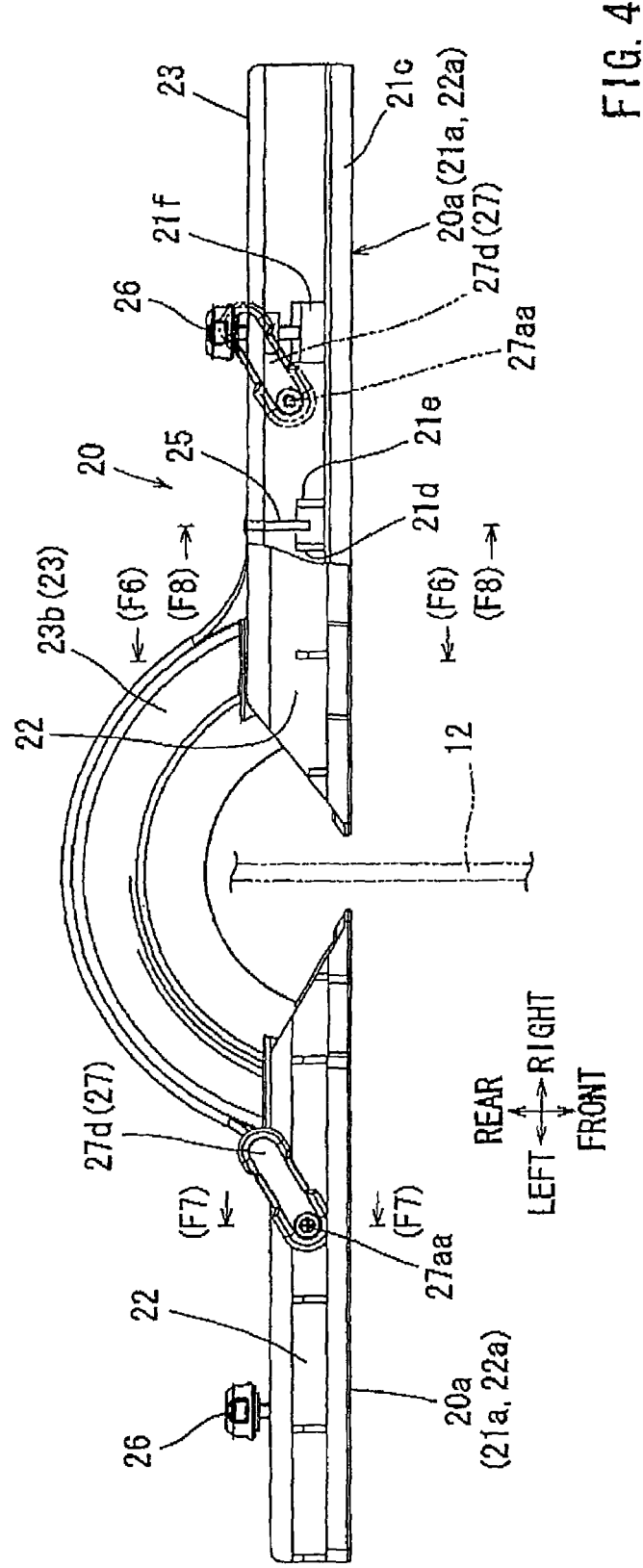
FIG. 4 is a plane view of the positioning fence.
Figure 5:
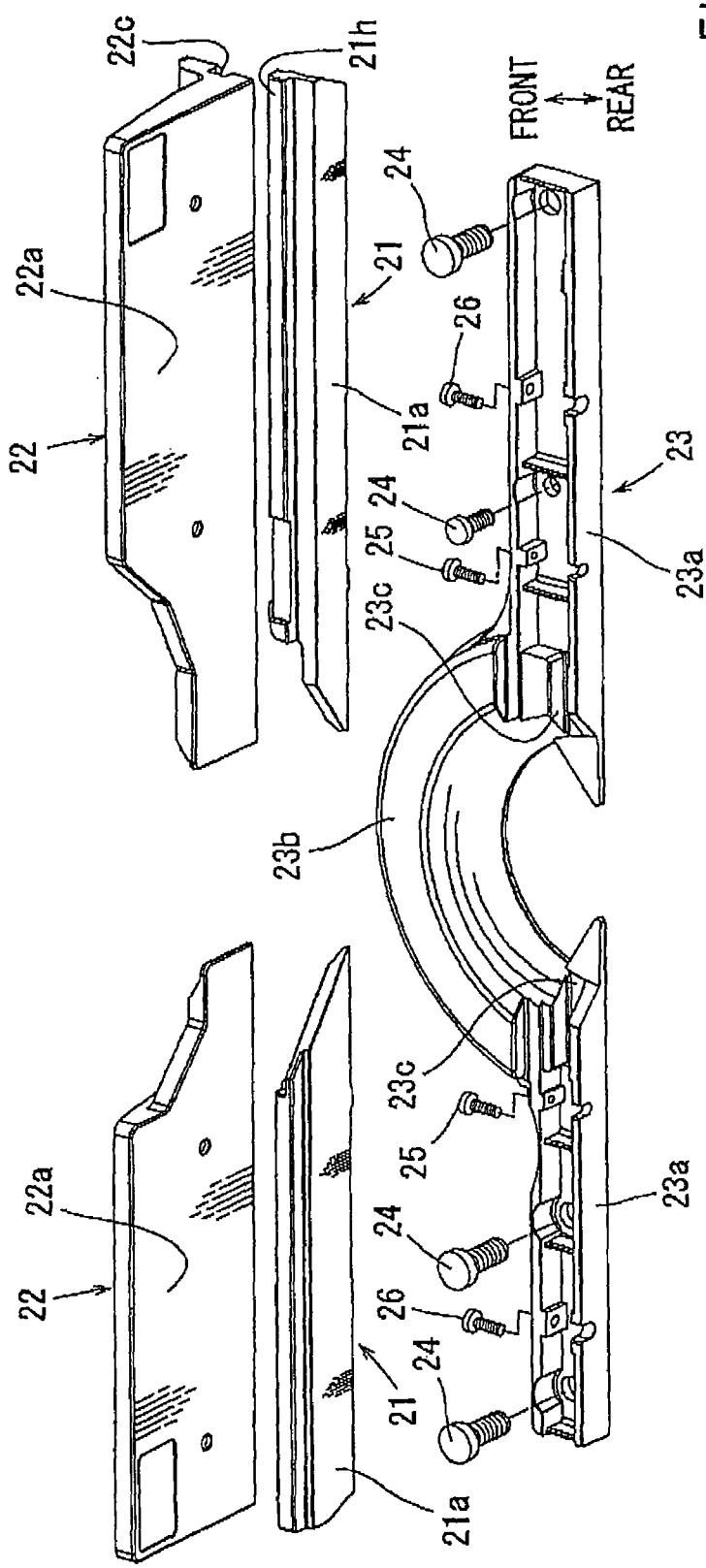
FIG. 5 is an exploded perspective view of the positioning fence.

The details of the positioning fence 20 are shown in FIG. 3 to FIG. 5. The positioning fence 20 includes the first slide fences 21, the second slide fences 22 and the frame 23. The frame 23 has a pair of left and right lateral frame portions 23a each formed to have an elongated box configuration with an upper opening, and a semicircular arch connecting portion 23b that connects both lateral frame portions 23a to be collinear at predetermined interval in a longitudinal direction. Both lateral frame portions 23a are fixed on the upper surfaces of the base portions 3a formed on the base 3 by means of fixing bolts 24, respectively. Both lateral frame portions 23a are symmetric to each other with respect to the rotary blade 12 and with respect to the center of rotation of the table 2 and are placed in a position so that the semicircular arch connecting portion 23b extends behind the rotary blade 12 as seen in a plan view.

Figure 6:
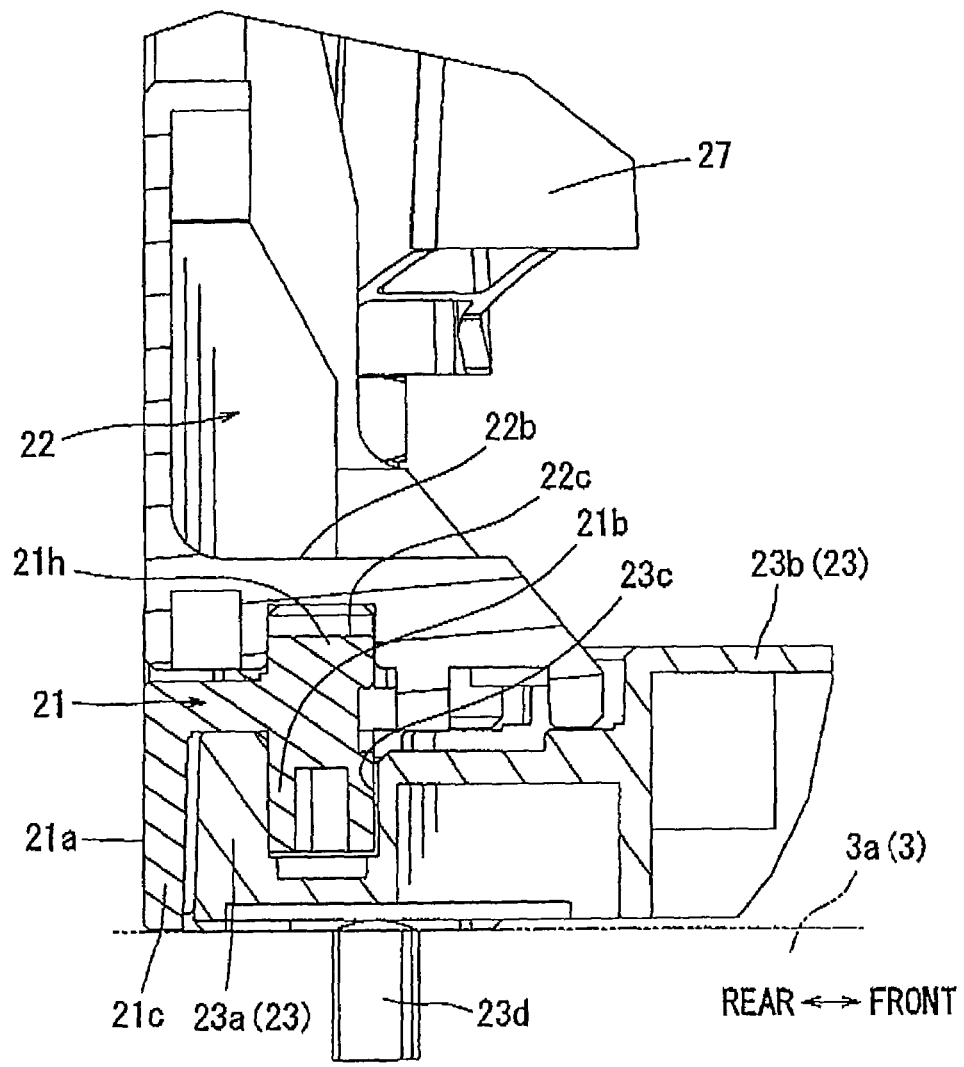
FIG. 6 is a fragmentary view taken along line (F6)-(F6)

The first slide fences 21 are supported on the left and right lateral frame portions 23a of the frame 23, respectively. The first slide fences 21 are slidably supported at the upper surfaces of the lateral frame portions 23a within a predetermined range along a longitudinal direction. FIG. 6 shows a construction for supporting the first slide fence 21 at the lateral frame portion 23a. The first slide fence 21 includes a contact surface portion 21c, an upper slide rail portion 21h protruding upward and a lower slide rail portion 21b protruding downward. The contact surface portion 21c is positioned to cover the front side of the lateral frame portion 23a (operator's side). The entire longitudinal front surface of the lateral frame portion 23a is covered by the contact surface portion 21c. The front surface of the contact surface portion 21c is designated to be the first positioning surface 21a. The lower end of the contact surface portion 21c, the upper surface of the table 2 and the upper surface of the base portion 3a are slightly spaced from each other to prevent a mutual interference.

The lower slide rail portion 21b is inserted into a slide groove portion 23c provided to a longitudinal inner end portion of the lateral frame portion 23a, resulting in reduction of clearance or rattling. Consequently, the left and right first slide fences 21 are supported to be able to slide in lateral directions (radial direction with respect to the center of rotation of the table 2) independent of each other.

Figure 8:
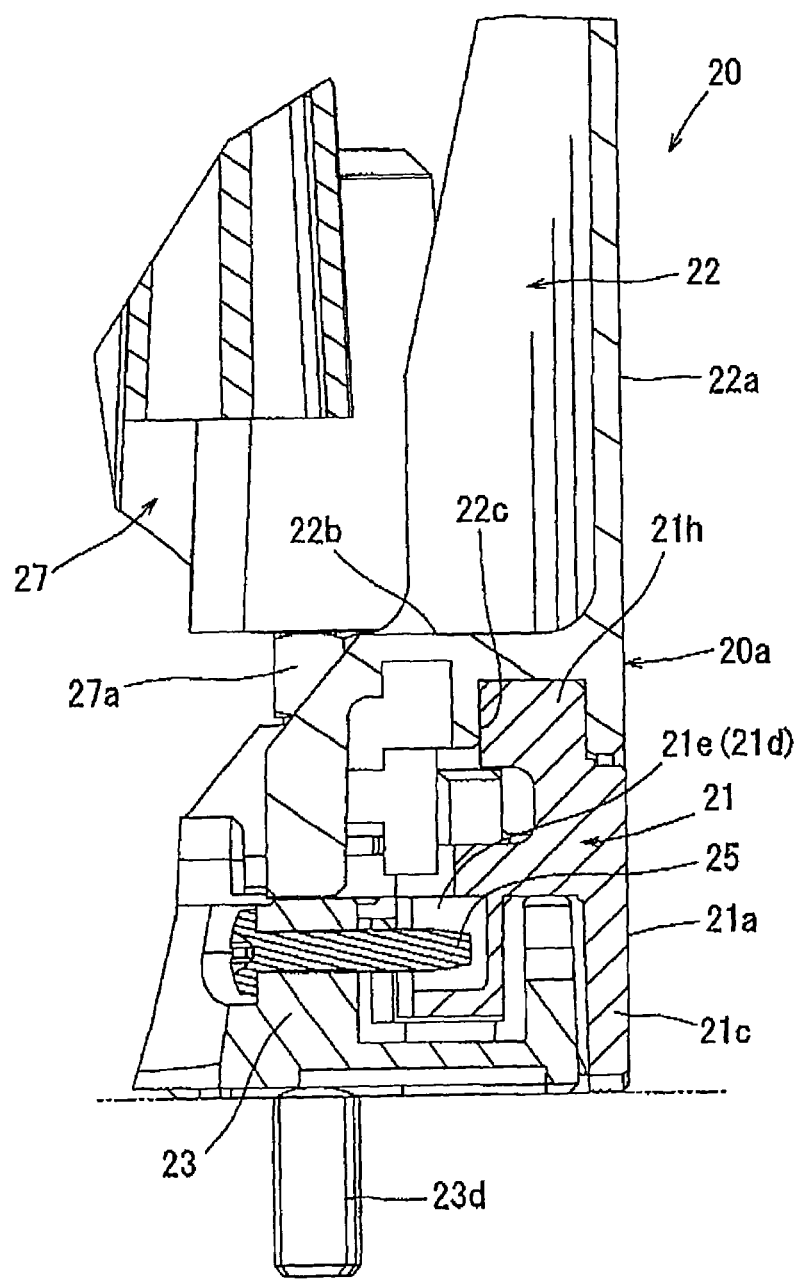
FIG. 8 is a fragmentary view taken along line (F8)-(F8)

As shown in FIGS. 4 and 8, restriction screws 25 are positioned at both left and right lateral frame portions 23a of the frame 23. A lower end portion of each of the restriction screws 25 extends between restriction wall portions 21d and 21e that are formed of each of the first slide fences 21 at a distance in a longitudinal direction. Therefore, both first slide fences 21 on the left and right sides are slidably movable in lateral directions within a range, in which the restriction screws 25 can move between the restriction wall portions 21d and 21e, so that the slide ends in lateral directions (directions toward or away from the rotary blade 12) are restricted. The slide ends on the side of the rotary blade 12 of the first slide fences 21 are set to be close to the rotary blade 12, a small distance but such that first slide fences 21 positioned at the slide ends do not interfere with the rotary blade 12 when the rotary blade 12 is located in a vertical cut position. This configuration allows the slide ends to be positioned much closer to the rotary blade 12 than that of prior configurations.

Fixing screws 26 are attached to both left and right lateral frame portions 23a of the frame 23, respectively. Lower end portions of both fixing screws 26 are pressed against a fixing base portions 21f that are formed of the first slide fences 21. When both fixing screws 26 are tightened and pressed firmly against the fixing base portions 21f, both left and right first slide fences 21 are fixed in a position, respectively. Both fixing base portions 21f are provided along a sliding direction of the first slide fences 21 corresponding to a distance between both restriction wall portions 21d and 21e, in which the restriction screws 25 can move (slide range of the first slide fences 21). As the fixing screws 26 are pressed against the fixing base portion 21f in the desired slide positions, both first slide fences 21 are fixed relatively independently in desired slide positions. When the fixing screws 26 are loosened, the pressing forces of the lower end portions applied against the fixing base portions 21f are reduced or released so that the first slide fences 21 are allowed to slide.

The second slide fences 22 are slidably supported on the upper sides of the left and right first slide fences 21. The upper slide rail portions 21h are arranged extending along the upper surfaces of the first slide fences 21 in a longitudinal direction. Both upper slide rail portions 21h are inserted into slide groove portions 22c without clearance or rattling. The slide groove portions 22c are formed in the lower surfaces of support flange portions 22b of the second slide fences 22. Both second slide fences 22 are slidably supported relative to the first slide fences 21, respectively.

Both second slide fences 22 are slidably supported relatively independent along the first slide fences 21, respectively. Therefore, the left and right first positioning surfaces 21a and the left and right second positioning surfaces 22a are always aligned flush with each other as they slide in lateral directions.

Figure 7:
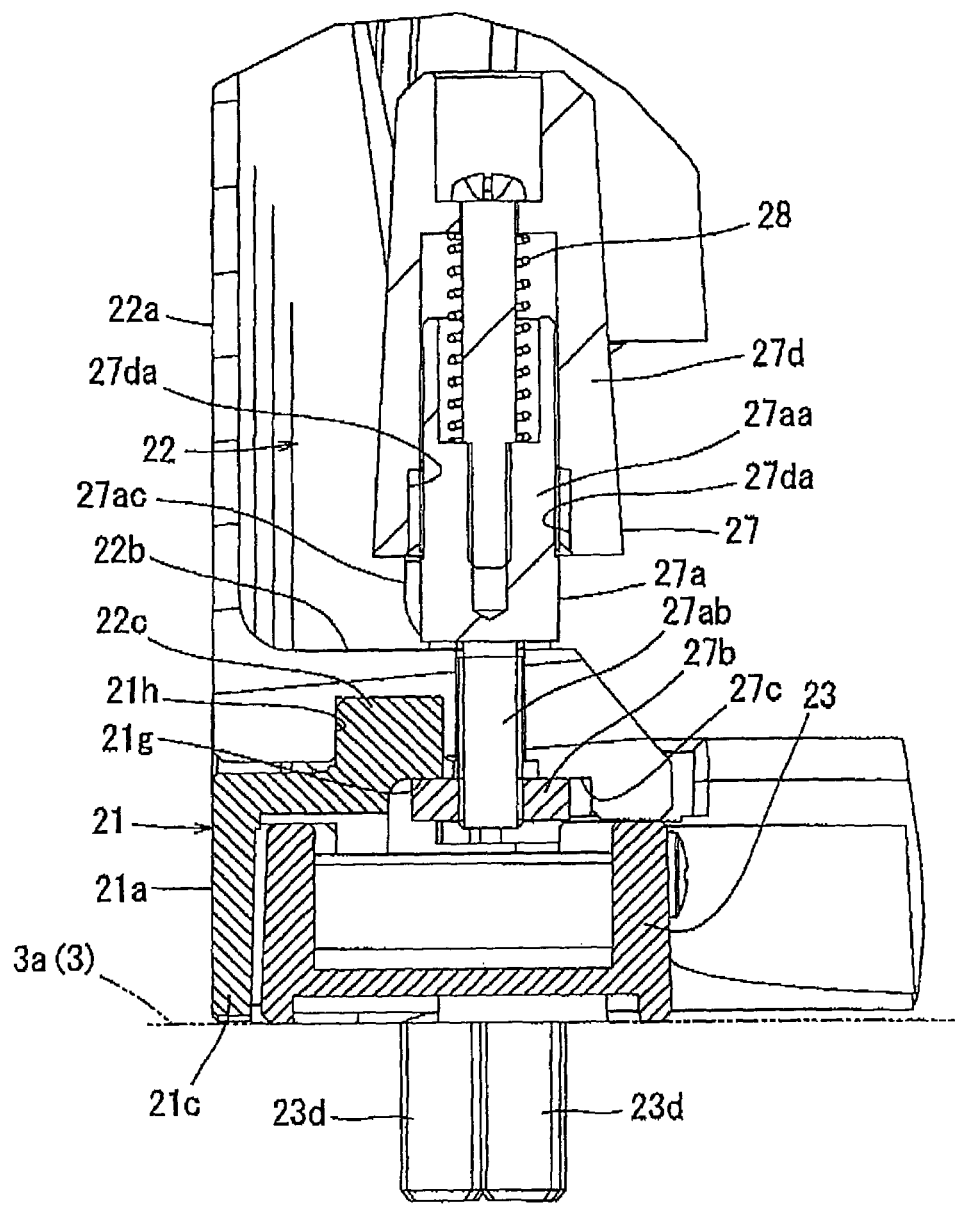
FIG. 7 is a fragmentary view taken along line (F7)-(F7)

Both second slide fences 22 are unslidably fixed relative to the first slide fences 21 by way of fixing levers 27. The fixing levers 27 are disposed on rear sides of the second positioning surfaces 22a, respectively. The details of the fixing lever 27 are shown in FIG. 7.

The fixing lever 27 include a lever body 27d and a lever shaft 27a. The lever shaft 27a includes a main shaft portion 27aa and a threaded shaft portion 27ab. The lever body 27d is axially movably mounted to the shaft portion 27aa within a predetermined range. A compression spring 28 is interposed between the main shaft portion 27aa and the lever body 27d. The lever body 27d is biased by the compression spring 28 in an upward direction as shown in FIG. 7. If the lever body 27d is pushed in a downward direction against the biasing force of the compression spring 28, an engagement protrusion 27ac, which extends axially at a single location along a circumferential surface of the main shaft portion 27aa, is inserted into any one of a plurality of engagement grooves 27da, which extends longitudinally along an inner circumferential surface of the lever body 27d in an axial direction. In this state, the lever body 27d can rotate in unison with the lever shaft 27a. Consequently, the lever shaft 27a is allowed to rotate around the axis by rotating the lever body 27 while the engagement protrusion 27ac is inserted into any one of the engagement grooves 27da as an operator pushes the lever body 27d downwardly against the biasing force of the compression spring 28. Conversely, when the pushing operation of the lever body 27d is released, the lever body 27d is upwardly moved by the compression spring 28 so that the engagement protrusion 27ac is removed from the engagement grooves 27da. Consequently, the lever body 27d is allowed to rotate relative to the lever shaft 27a and therefore, inadequate rotational operation of the fixing lever 27 can be prevented (slide lock position of the second slide fence 22).

The threaded shaft portion 27ab of the lever shaft 27a is threaded into a support flange portion 22b of the second slide fence 22 and protrudes from the lower surface of the support flange portion 22b. The fixing flange 27b is fixed to this protruding portion. The fixing flange 27b is interposed and fitted in contact relation between the guide groove portion 27c of the second slide fence 22 and a guide groove portion 21g of the first slide fence 21. The fixing flange 27 is formed as a rectangular flat plate and is prevented from rotation within both guide groove portions 27c and 21g.

If the lever body 27d is pushed in a downward direction and rotated toward a fixing side (in a counterclockwise direction as viewed in FIG. 4), the threaded shaft portion 27ab is rotated in a direction to be loosened and moved slightly in an upward direction. As a result, the fixing flange 27b is pressed firmly against the upper surfaces (upper bottoms) of both guide groove portions 27c and 21g so that the second slide fence 22 is fixed to the first slide fence 21.

If the lever body 27d is pushed in a downward direction and rotated in a direction toward a releasing side (in a clockwise direction as viewed in FIG. 4), the fixing flange 27b moves away from the upper surfaces of both guide groove portions 27c and 21g so that the pressing force may be reduced or released. As a result, the second slide fence 22 is allowed to sliday move relative to the first slide fence 21 (slide unlocked position of the second slide fence 22).

The guide groove portion 21g defined on the side of the first slide fence 21 extends along the entire longitudinal length of the first slide fence 21. When the second slide fence 22 is located in a slide unlock position, in which the fixing lever 27 is loosened, the second slide fence 22 is removable from the first slide fence 21 by slidably moving the second fence 22 in an outward direction.

As shown in FIG. 3, the upper end portions of the first slide fences 21 and the second slide fences 22 adjacent to the rotary blade 12 are cut to form escape portions in order to avoid interference with the rotary blade 12 during an inclined cutting operation, in which the rotary blade 12 is tilted to the left or right.

According to this aspect of table saw 1, the workpiece can be positioned in front and rear directions within a plane parallel to the table surface by placing the workpiece on the upper surface of the table 2 and positioning the workpiece to contact with the positioning surface 20a of the positioning fence 20. The cutting operation is performed by moving the cutting unit 10 in a downward direction while the rotary blade 12 is rotated to cut into the workpiece W with the workpiece W fixed in a position by the clamp device. If these steps of the cutting operation are performed with the table 2 turned by a predetermined angle, an oblique cutting operation can be performed. An inclined cutting operation can be performed, if these steps of the cutting operation are performed with the cutting unit 10 tilted to the left or right.

The positioning fence 20 provided to this table saw 1 includes the first and the second slide fences 21 and 22 that are arranged substantially synmetrical with respect to the rotary blade 12. The first slide fences 21 positioned on the left and the right sides are slidably supported in lateral directions relatively independent from each other. The second slide fences 22 positioned on the left and the right sides are slidably supported in lateral directions with respect to the first slide fences 21. The double dot chain lines as shown in FIG. 2 indicate the slidably moved position of the first and the second slide fences 21 and 22. As shown in FIG. 2, the first and second slide fences 21 and 22 are slidably supported in later directions relatively independent from each other and form the positioning surface 20a of the positioning fence 20.

If the vertical cutting operation is performed while the rotary blade 12 is vertically positioned with respect to the positioning surface 20a, the first and second slide fences 21 and 22 positioned on the left and the right are slidably moved in the directions approaching toward each other and may be fixed in positions by a small distance without interference with the rotary blade 12. In this way, by fixing positions of the first and second slide fences 21 and 22, even a part of a tall workpiece W can be accurately cut from a tall workpiece W, and may be cut off with a narrow width, when the workpiece W is securely positioned by abutting this part to the positioning surface 20a.

If a cutting operation is performed while the rotary blade 12 is inclined or tilted relative to the positioning surface 20a, for example, when an oblique cutting operation is performed, in which the table 2 is turned or an inclined cutting operation is performed, in which the cutting unit 10 is tilted to the left or right, all first and second slide fences 21 and 22 may be slidably moved in lateral directions away from each other so as to have an appropriate distance with respect to the rotary blade 12. In this way, a mutual interference with the rotary blade 12 can be avoided.

Also, by any one of the cutting operations, such as a vertical cutting operation, an oblique cutting operation or an inclined cutting operation, when the workpiece is relatively short in height, only the first lower slide fences 21 may be moved toward each other within a range without interfering the rotary blade 12 by slidably moving the second upper slide fences 22 in directions away from each other so that the first positioning surfaces 21a can be used as a positioning surface 20a.

Figure 9:
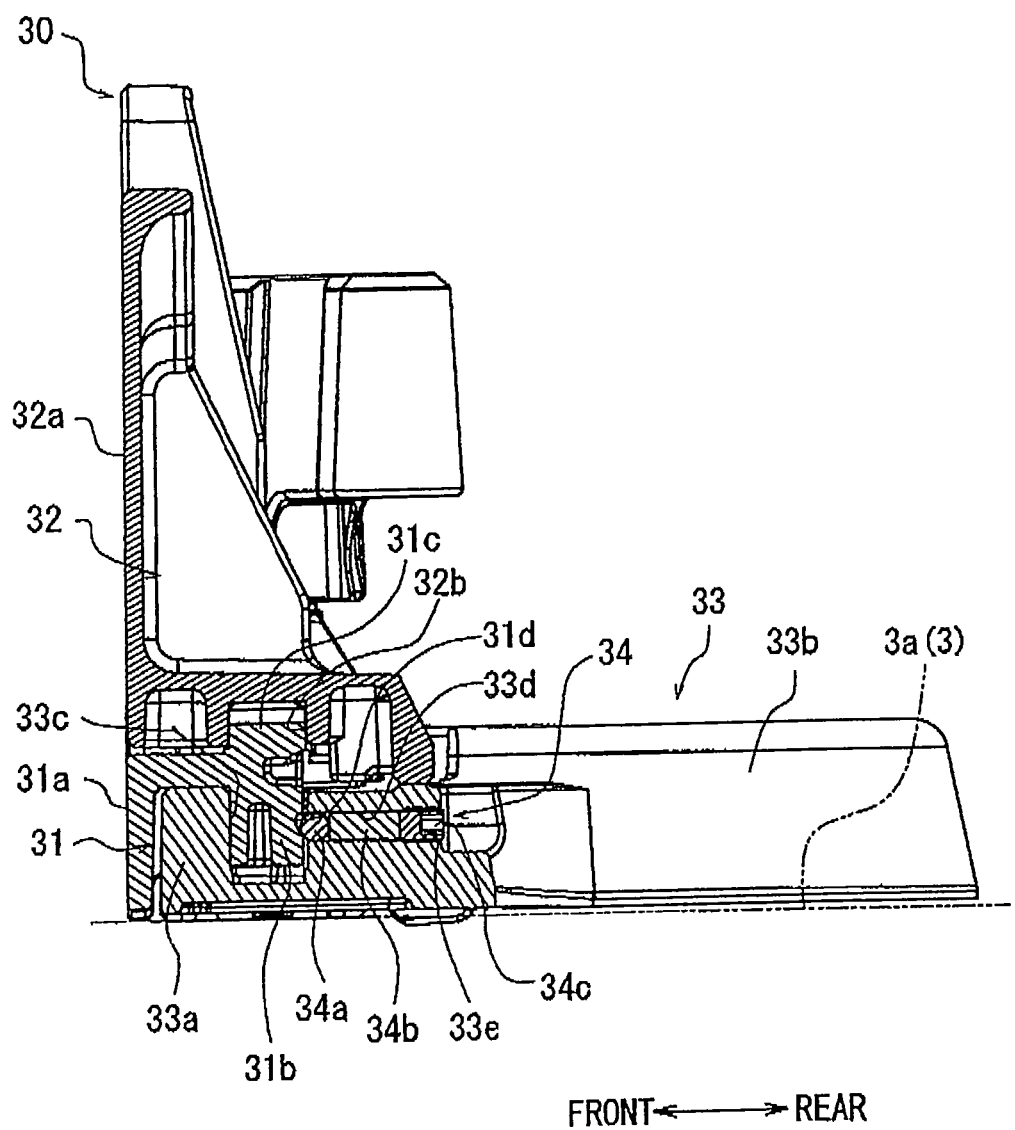
FIG. 9 is a longitudinal sectional view of a positioning fence according to another aspect including a clearance restricting member.
Figure 10:
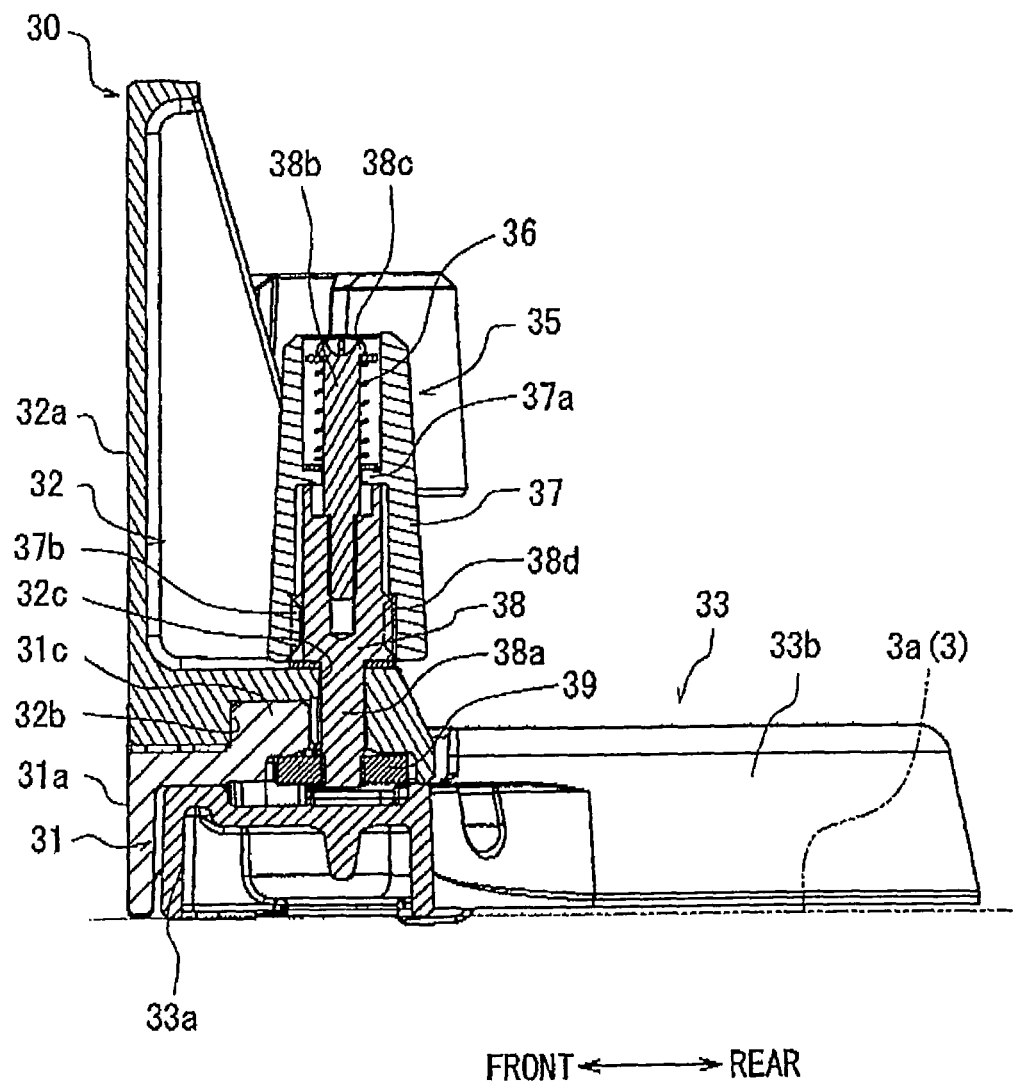
FIG. 10 is a longitudinal sectional view of the positioning fence showing a longitudinal sectional view of a fixing lever.

Various modifications can be made to the above embodiment. For example, FIGS. 9 and 10 show a positioning fence 30 according to another configuration. The positioning fence 30 includes clearance restricting members 34 that can be incorporated in the positioning fence 20 of the prior configuration. The same reference numerals may be used for the same members and for such constructions the detailed explanation is omitted.

As shown in FIG. 9, the positioning fence 30 according to the second embodiment includes a pair of first slide fences 31 and a pair of second slide fences 32 arranged on the left and right side. Front surfaces of the first slide fences 31 define first positioning surfaces 31a and are allocated to lower positioning surfaces. Front surfaces of the second slide fences 32 define second positioning surfaces 32a and are allocated to the upper positioning surfaces. The first positioning surfaces 31a and the second positioning surfaces 32a are aligned to be flush with each other and form a single large positioning surface. The first slide fences 31 are slidably supported extending over left and right lateral frame portions 33a of a frame 33. The left and right lateral frame portions 33a are connected by means of a semicircular arch connecting portion 33b. The left and right lateral frame portions 33a are secured to an upper surface of a base portion 3a of a base 3, respectively.

Slide groove portions 33c are provided on the upper surfaces of the left and right lateral frame portions 33a extending along the longitudinal directions. Lower slide rail portions 31b of the first slide fences 31 are slidably supported within the slide groove portions 33c. Upper slide rail portions 31c are provided on the upper surfaces of the left and right slide fences 31, respectively. The upper slide rail portions 31c are slidably supported within slide grooves 32b defined on the lower surfaces of the second slide fences 32. In this way, similar to the first embodiment, the first and second slide fences 31 and 32 are supported to be able to slide relatively independent in a radial direction of the table 2.

Clearance restricting members 34 that can be adjusted by screws, are provided to the left and right lateral frame portion 33a, respectively. As shown in FIG. 9, a support hole 33d is formed at the rear surface of the lateral frame portion 32a. The support hole 33d extends from the rear surface of the lateral frame portion 33a through the slide groove portion 33c. A threaded hole 33e is formed at the end portion of the support hole 33d. The clearance restricting member 34 is positioned within the support hole 33d.

The clearance restricting member 34 include a steel ball 34a, a pressure pin 34b and an adjusting screw 34c, that are respectively aligned from the back side of the support hole 33d (the side of the slide groove portion 33c) toward the end portion of the support hole 33d (the side of the threaded hole 33c). The steel ball 34a engages within an engagement groove 31d formed in the side portion of the lower slide rail portion 31b of the first slide fence 31. The engagement groove 31d is formed extending along the lower slide rail portion 31b in a longitudinal direction within a predetermined range. Similar to the first embodiment, the first slide fence 31 can slidably move in lateral directions within a range, in which the steel ball 34a is relatively movable within the engagement groove 31d.

The adjusting screw 34c is tightened into the threaded hole 33e of the support hole 33d. The steel ball 34a is biased in a direction to engage with the engagement groove 31d via the pressure pin 34b as the adjusting screw 34c is tightened. According to the clearance restricting member 34, the lower slide rail portion 31b can be pressed against the front side of the slide groove portion 33c when the adjusting screw 34c is tightened into the threaded hole 33e of the support hole 33d so that the steel ball 34a is pressed against the lower slide rail portions 31b from the rear side. In this way, the rattling or clearance between the lower slide rail portion 31b and the slide groove portion 33c can be removed. Therefore, the first slide fences 31 can be accurately and quickly positioned because the rattling caused by a processing error is removed.

Further, the pressing force of the steel ball 34a can be adjusted by adjusting a penetration depth of the adjusting screw 34c into the threaded hole 33e. If the penetration depth of the adjusting screw 34c is deep, the steel ball 34a is pressed against the engagement groove 31d with increased force. Therefore, the rattling or clearance caused by the lower slide rail portion 31b within the slide groove portion 33c can be restricted. The slide rail portion 31b can be smoothly slidably moved along the lateral frame portion 33a reducing the rattling by appropriately adjusting the penetration depth of the adjusting screw 34c. Therefore, because the positions of the first slide fences 31 can be more accurately and quickly adjusted, the operability of the positioning fence 30 can be improved.

Moreover, similar to the prior configuration, the first slide fence 31 is fixed by tightening the fixing screw 26. In addition, the slide position of the first slide fence 31 is fixed when the penetration depth of the adjusting screw 34c is adjusted to be maximum.

As shown in FIG. 10, the second slide fence 32 is fixed to the first slide fence 31 by rotating the fixing lever 35. This configuration is the same as the prior configuration in that regard. However, according to the fixing lever 35 of this configuration, a direction for operating a lever body 37 is opposite to the direction as described in the prior configuration. In the prior configuration, the lever body 27d is engaged with the lever shaft 27a so as to be able to rotate therewith when the lever body 27d is pushed in a downward direction against the biasing force of the compression spring 28. On the other hand, in this configuration, the lever body 37 is released from a threaded shaft 38 so as not to rotate therewith when the lever body 37 is lifted in an upward direction against the biasing force of a compression spring 36.

An insertion shaft portion 38a of the threaded shaft 38 protrudes downwardly via an insertion hole 32c of the second positioning fence 32. Similar to the prior configuration, a fixing flange 39 is threadably connected to a lower portion of the insertion shaft portion 38a. The fixing flange 39 extends between and contacts with lower surfaces of both first slide fence 31 and the second slide fence 32. The fixing flange 39 is prevented from rotating around an axis of the insertion shaft portion 38a. If the threaded shaft 38 rotates, the threaded connection to the fixing flange 39 is tightened or loosened conversely.

An extension rod 38b is mounted to an upper portion of the threaded shaft 38. The extension rod 38b protrudes upwardly through a bottom wall portion 37a of the lever body 37. The compression spring 36 is interposed between of a head portion 38c of the protruded portion and the bottom wall portion 37a. The lever body 37 is therefore, biased in a downward direction.

A plurality of engagement protrusions 37b are formed at an inner circumference of the lower part of the lever body 37 and are arranged along a circumferential direction. A plurality of engagement protrusions 38d are formed at an outer circumference of the lower part of the threaded shaft 38. As shown in FIG. 10, if the lever body 37 is biased in a lower position by way of the compression spring 36, the engagement protrusions 37b engage with the engagement protrusions 38d of the threaded shaft 38 so that the lever body 37 can rotate in unison with the threaded shaft 38. Therefore, when the engagement protrusions 37b engage with the engagement protrusions 38b, the threaded shaft 38 can be rotated by rotating the lever body 37. As the threaded shaft 38 rotates, the fixing flange 39 can be tightened or loosened so that the second slide fence 32 is fixed or slidable with respect to the first slide fence 31.

If the lever body 37 is lifted in an upward direction against the biasing force of the compression spring 36, the engagement protrusions 37b move upwardly so that the engagement of the engagement protrusions 37b with respect to the engagement protrusions 38d of the threaded shaft 38 is released. When the engagement of the engagement protrusions 37b with respect to the engagement protrusions 38d is released, the lever body 37 may idle around the threaded shaft 38.

When the lifting operation of the lever body 37 is released, the lever body 37 is returned in a downward position by the compression spring 36. If the lever body 37 is returned in the downward position, the engagement protrusions 37b and the engagement protrusions 38d engage with each other so that the lever body 37 can rotate in unison with the threaded shaft 38.

Because this configuration is different from the prior configuration in that the threaded shaft 38 can be rotated by rotating the lever body 37 without lifting the lever body 37 in an upward direction, it is possible to improve the operability. Further, because the lever body 37 can be maintained in a position lower than the position as described in the prior configuration as long as the lever body 37 is not lifted, it is possible to prevent other members from interfering with the lever body 37.

Because the integral rotation of the lever body 37 with the threaded shaft 38 can be released by lifting the lever body 37 against the biasing force of the compression spring 36, the position of the lever body 37 around the axis can be easily changed in an optimal position with respect to the threaded shaft 38 (a position for obtaining a sufficient rotational angle).

Various modifications can further be made to the prior configurations that are illustrated above. For example, the illustrated positioning fence 20 (30) with upper and lower slidable slide fences 21, 22 (31, 32) can be applied to a table cutting device that has no function for slidably moving the cutting unit 10 within a plane parallel to a table surface or to a cutting device that does not include the lateral tilt mechanism 6 for tilting the cutting unit 10 to the left or right. In these cases, it is also possible to obtain the same functional effect as of the oblique cutting operation that is performed by turning the table 2.

The positioning fences 20 (30) extend over the table 2 to be supported to the base 3. However, the positioning fences can be directly supported to a table that is not turnable.

The first slide fences 21 (31) are slidably supported by the frame 23 (33) and the second slide fences 22 (32) are slidably supported by the first slide fences 21 (31). However, all first and second slide fences 21, 22 (31, 32) can be slidably supported directly by the frame 23 (33).

The region vertically above the table 2 is divided into two regions to form the first slide fences 21 (31) and the second slide fences 22 (32). However, the region may be divided into many more regions to form individually slidable fences. According to this construction, either a wide positioning surface or a narrow positioning surface may be selected depending on the modes of the cutting operations. Thus, it is possible to cope with various modes of cutting operations because the wide positioning surface and the narrow positioning surface for contacting with a workpiece can be selected.

The steel ball 34a may be omitted so that the pressure pin 34b can be directly pressed against the lower guide rail portion 31b.

The clearance restricting member 34 is adopted to adjust a play or clearance in a direction perpendicular to the sliding direction of the first positioning fence 31 relative to the frame 23. However, the clearance restricting member 34 may also be provided to the second positioning fence 32 so that the steel ball 34a is pressed against the slide rail portion 31c of the first slide fence 31 in order to absorb the rattling or clearance in a direction perpendicular to the sliding direction. According to this construction, not only can the rattling or clearance of the first slide fence 31 relative to the frame 23 can be removed, but also the rattling and clearance of the second slide fence 32 relative to the frame 23 be removed. Therefore, more accurate and quick positioning can be achieved.

Various modes for fixing and positioning a workpiece W can be voluntary selected. In the first mode, the first slide fences 21 (31) are respectively fixed to both lateral frame portions 23a (33a) that are formed to the left and right sides of the frames 23 (33) and the second slide fences 22 (32) are respectively fixed to the left and right first slide fences 21 (31). The first mode is used without adjusting a position of the slide fences in accordance with a size or a configuration of a workpiece. In the second mode, the first slide fences 21 (31) are fixed to the frame 23 (33) and the second slide fences 22 (32) are moved relative to the first slide fences 21 (31) to be adjusted in accordance with a size or a configuration of a workpiece. In the third mode, the second fences 22 (32) are fixed to the first slide fences 21 (31) and both first and second slide fences 21 (31), 22 (32) are integrally moved relative to the frames 23 (33) to be adjusted in accordance with a size or a configuration of a workpiece. It is also possible to release fixation, as described in the third mode, of the second slide fences 22 (32) with respect to the first slide fences 21 (31) so that both first and second slide fences 21, 22 (31, 32) can be individually fixed in their positions.

According to this construction, because the positioning fences 20 (30) can be used in voluntary modes, in accordance with various factors such as a size or a configuration of the workpiece W, the operability and the versatility can be improved. Also, because the large positioning surfaces 2la, 22a (31a, 32a) for contacting with the workpiece W can be ensured, the workpiece W can be securely positioned even if the size of the workpiece is large.

What is claimed is:
1. A table saw comprising:
a table capable of supporting a workpiece;
a cutting unit disposed above the table; and
a positioning fence disposed along an upper surface of the table and capable of positioning the workpiece within a plane parallel to a table surface;
wherein the positioning fence includes a frame connected along an upper surface of the table, a first slide fence supported by the frame and slidably movable relative to the frame in parallel with the table surface, and a second slide fence supported by the first slide fence and slidably movable relative to the first slide fence in parallel with the table surface; wherein a first positioning surface of the first slide fence defines a lower positioning surface and a second positioning surface of the second slide fence defines an upper positioning surface, the first positioning surface of the first slide fence has a lower end that is positioned at substantially a same level as the upper surface of the table, the frame has a front end surface that is positioned rearwardly of the first positioning surface of the first slide fence, the frame has an upwardly oriented projection, and the first slide fence has a downwardly oriented groove for engaging the upwardly oriented projection, the upwardly oriented projection of the frame has a front surface and a rear surface extending parallel to each other in a substantially vertical direction, the downwardly oriented groove of the first slide fence has a front surface and a rear surface extending parallel to each other in a substantially vertical direction, so that the front surface and the rear surface of the upwardly oriented projection and the front surface and the rear surface of the downwardly oriented groove of the first slide fence extend parallel to each other, and the front surface and the rear surface of the upwardly oriented projection are respectively opposed to the front surface and the rear surface in a forward and a rearward direction.

2. The table saw as in claim 1, wherein the cutting unit has a rotary blade, and each of the first slide fence and the second slide fence includes left and right fences arranged on a left side and a right side of the cutting unit with respect to the rotary blade.

3. The table saw as in claim 1, wherein the first slide fence includes a first slide fixing device configured to be able to fix the first slide fence to the frame, and wherein the second slide fence includes a second slide fixing device configured to be able to fix the second slide fence to the first slide fence.

4. The table saw as in claim 2, wherein the first slide fence includes a first slide fixing device configured to be able to fix the first slide fence to the frame, and wherein the second slide fence includes a second slide fixing device configured to be able to fix the second slide fence to the first slide fence.

5. The table saw as in claim 1, wherein the table saw includes a clearance restricting member for restricting a movement perpendicular to a slide direction of the first slide fence, and wherein the clearance restricting member restricts a movement perpendicular to the slide direction of the first slide fence relative to the frame by adjusting a penetration depth of a screw.

6. The table saw as in claim 5, wherein the clearance restricting member includes a ball capable of cooperating with the screw.

7. The table saw as in claim 1, wherein the table saw includes a clearance restricting member for restricting a movement perpendicular to a slide direction of the second slide fence, and wherein the clearance restricting member restricts a movement perpendicular to the slide direction of the second slide fence relative to the first slide fence by adjusting a penetration depth of a screw.

8. The table saw as in claim 1, wherein a front surface of the upwardly oriented projection defines the front end surface of the frame, the first slide fence has a downwardly oriented vertical extension positioned on a front side of the downwardly oriented groove, and a front surface of the downwardly oriented vertical extension defines at least a part of the first positioning surface.

9. The table saw as in claim 1, wherein:

the upwardly oriented projection of the frame further includes an upper surface;

the downwardly oriented groove of the first slide fence further includes a bottom surface; and the upper surface of the upwardly oriented projection and the bottom surface of the downwardly oriented groove are opposed to each other in a vertical direction and extend parallel to each other in a substantially horizontal direction.

10. The table saw as in claim 1, wherein each of the upwardly oriented projection and the downwardly oriented groove are opposed to each other in a vertical direction and extend parallel to each other in a substantially horizontal direction.

11. The table saw as in claim 1, wherein:

the frame further includes an upwardly oriented groove positioned proximal to and rearwardly of the upwardly oriented projection;

the first slide fence further includes a downwardly oriented projection positioned proximal to and rearwardly of the downwardly oriented groove;

the upwardly oriented groove and the downwardly oriented projection slidably engage with each other; and each of the upwardly oriented groove and the downwardly oriented projection has a substantially rectangular shape in a cross section along a plane perpendicular to the sliding direction of the first slide fence.

12. The table saw as in claim 10, wherein:

the frame further includes an upwardly oriented groove positioned proximal to and rearwardly of the upwardly oriented projection;

the first slide fence further includes a downwardly oriented projection positioned proximal to and rearwardly of the downwardly oriented groove;

the upwardly oriented groove and the downwardly oriented projection slidably engage with each other; and each of the upwardly oriented groove and the downwardly oriented projection has a substantially rectangular shape in a cross section along a plane perpendicular to the sliding direction of the first slide fence.

* * * * *